United States Patent [19]

Narayama et al.

[11] Patent Number: 5,266,262
[45] Date of Patent: Nov. 30, 1993

[54] METHOD FOR INJECTION MOLDING A LARGE THICKNESS FLANGE AT END OF BLOW MOLDING TUBE

[75] Inventors: Shigeru Narayama; Takeshi Fukumoto, both of Noda, Japan

[73] Assignee: Mitoyo Resin Co. Ltd., Noda, Japan

[21] Appl. No.: 905,809

[22] Filed: Jun. 29, 1992

[30] Foreign Application Priority Data

Jul. 19, 1991 [JP] Japan ................... 3-203581

[51] Int. Cl.⁵ .................. B29C 45/14; B29C 49/20
[52] U.S. Cl. .................. 264/513; 264/276; 264/277; 264/278; 264/279; 264/515; 425/525
[58] Field of Search ............ 264/513, 515, 279, 261, 264/265, 275, 276, 277, 278; 425/525

[56] References Cited

U.S. PATENT DOCUMENTS

| | | | |
|---|---|---|---|
| 4,510,013 | 4/1985 | Lupke et al. | 264/515 |
| 4,724,111 | 2/1988 | Iwata et al. | 264/279 |
| 5,049,224 | 9/1991 | Umezawa et al. | 264/515 |
| 5,089,208 | 2/1992 | Nakamura et al. | 264/513 |

FOREIGN PATENT DOCUMENTS

| | | | |
|---|---|---|---|
| 2500370 | 8/1982 | France | 264/279 |
| 49-36947 | 10/1974 | Japan | 264/513 |
| 62-051426 | 3/1987 | Japan | 264/513 |
| 62-116119 | 5/1987 | Japan | 264/279 |
| 104815 | 5/1988 | Japan . | |
| 63-154335 | 6/1988 | Japan | 264/531 |
| 290715 | 11/1988 | Japan . | |
| 1122516 | 8/1968 | United Kingdom | 264/513 |

Primary Examiner—Catherine Timm
Attorney, Agent, or Firm—Martin Smolowitz

[57] ABSTRACT

A method for forming a large thickness flange at an end of a blow molding tube by injection molding using a die assembly. The blow molding tube is sufficiently cooled down before insertion into injection molding dies. The sizes and dimensions of tube holding portions of the injection molding die assembly, which hold the blow molding tube at a portion adjacent to the end, and those of a mating injection molding mandrel are set in conformity to its size and dimension of the blow molding tube after thermal shrinkage thereof caused by cooling of the tube. Thus, any gap between the blow molding tube and injection molding die assembly is eliminated, so that any leakage of molten resin through such a gap between the contact surfaces of the blow molding tube and those of the injection molding dies and mandrel can be perfectly prevented during the injection molding step. For instance, the method is useful for producing an intake manifold used in an automotive engine room.

4 Claims, 3 Drawing Sheets

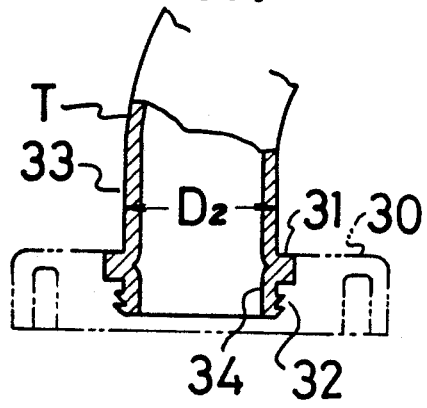
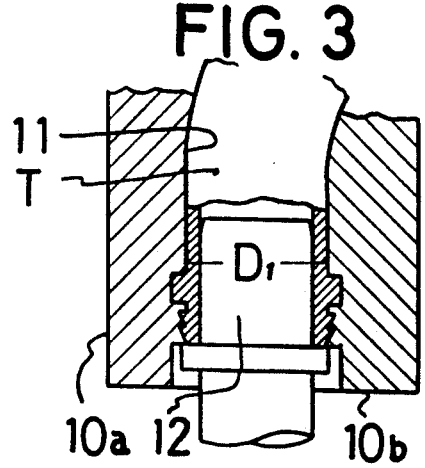
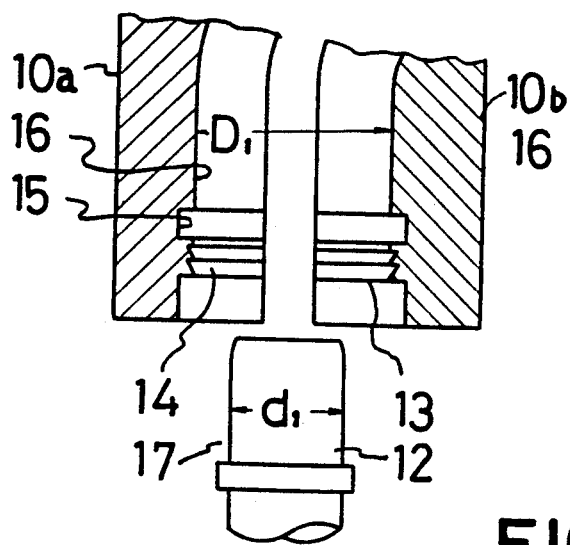
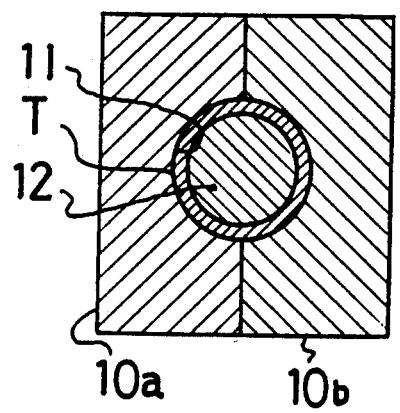
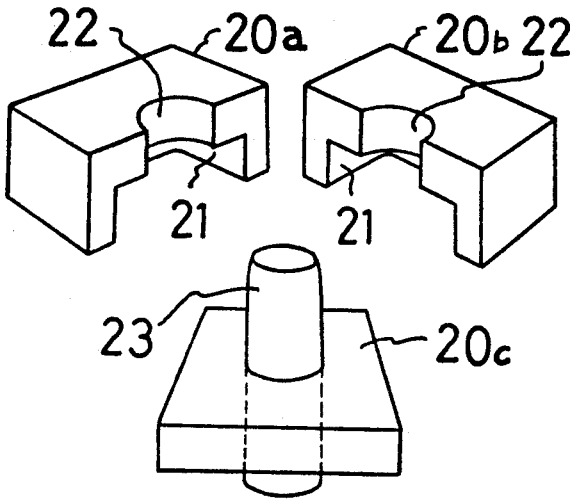

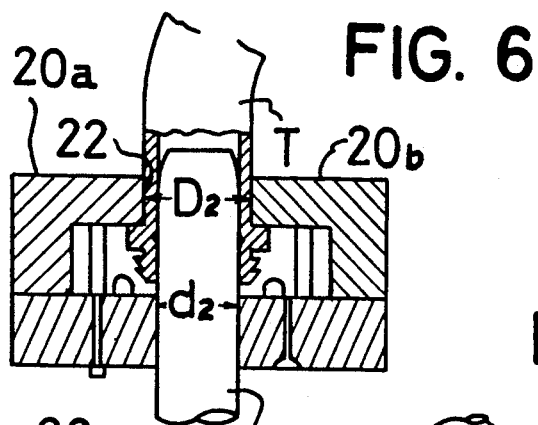
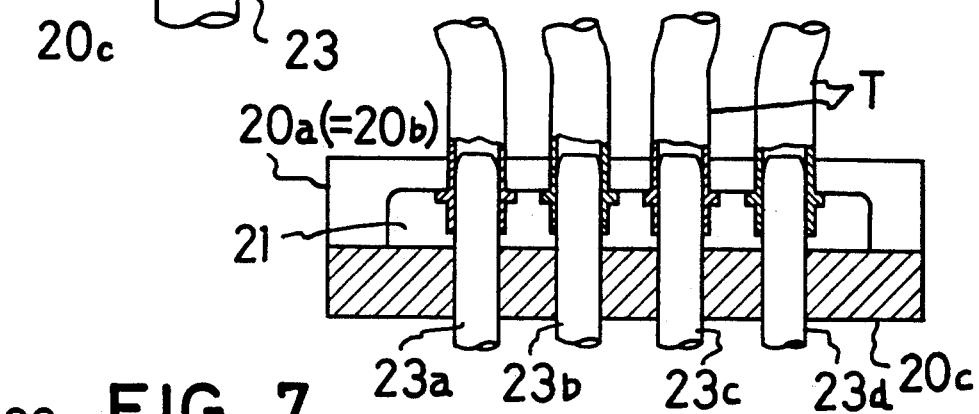
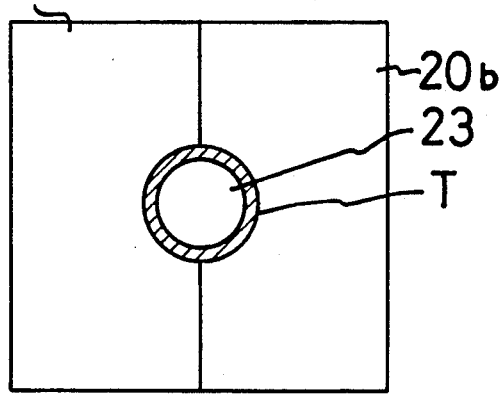
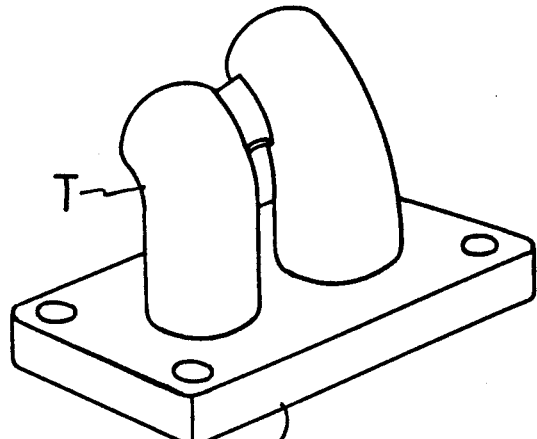
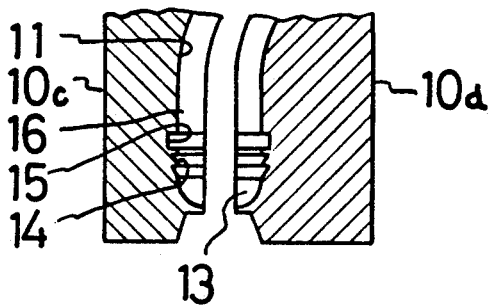

METHOD FOR INJECTION MOLDING A LARGE THICKNESS FLANGE AT END OF BLOW MOLDING TUBE

BACKGROUND OF THE INVENTION

1. Field of the Invention

This invention relates to a method for producing a blow molding tube or tubes having a large thickness flange injection molded at an end of the tube.

2. Prior Art

Methods for producing such a tube with an end flange are disclosed in Japanese Patent Application Laid-Open 104815/1988 and Japanese Patent Application Laid-Open 290715/1988.

In the method disclosed in the former publication a, molding material or parison is extruded so as to be longer than the blow molding die assembly. And, when a mandrel is forced into the die assembly from one end thereof, the longish portion of the molding material is squeezed so as to form an integral flange at the tube end.

The method disclosed in the latter publication, has been developed earlier by the present applicant. In this method, a blow molding tube is inserted into an injection molding die assembly while it is not yet cooled down after blow molding, and a flange portion is formed by injection molding so that the injection molding flange is integral with the blow molding tube.

In the former method, however, the upper limit of the obtainable thickness of the flange is about the same to 1.5 times that of the molding material or parison. Therefore, the method is not suitable for producing a tube with a large thickness flange such as an engine intake manifold shown in FIG. 11, which is used in an automotive engine room.

The latter method is superior in its thermal efficiency. However, molten resin is liable to leak through the gap between the blow molding tube and injection molding dies at the time of the injection molding, thus resulting in a defective molded product.

SUMMARY OF THE INVENTION

An object of the invention, accordingly, is to provide a method to the molded products market, which can form a large thickness flange accurately at an end of a blow molding tube without possibility of leakage of molten resin through any gap between the blow molding or molded product and an injection molding die assembly at the time of the injection molding, although the method is subject to some loss in the thermal efficiency.

To attain the above object of the invention, there is provided a method for injection molding a large thickness flange at an end of a blow molding tube or tubes by inserting the blow molding tube into a cavity of an injection molding die assembly, which holds the outer periphery of the tube portion adjacent to the end, such that the end of the blow molding tube projects into the cavity, inserting a mandrel for injection molding into the cavity, which mandrel is provided in the injection molding die assembly and has such sizes and dimensions that it is close contact with the inner periphery of the tube end, after insertion of the blow molding tube, and then injecting a molten synthetic resin into the cavity, which resin has a property of being thermally fusedly bonded to the tube end, and then separating the injection molded tube product from the injection molding die assembly and the mandrel.

For this invention either of two preparation steps can be carried out, one of the two steps comprises forming the outer shape of the blow molded tube end portion to be held by the injection molding die assembly by using the blow molding die assembly such that the outer dimension of the tube portion, after being separated from the blow molding die assembly and then sufficiently cooled down, is set so that the tube end portion is in close contact with the tube holding surface of the injection molding die assembly. The other one of the two steps comprises setting the inner shape of the end of the blow molding tube to be coaxial with the outer shape of the tube portion to be closely held with the injection die assembly, and correcting the inner shape and dimension of the blow molding tube after cooling thereof in conformity to the outer shape and dimension of the mandrel provided in the blow molding die assembly or those of the mandrel provided in the injection molding die assembly.

After carrying out either of the two steps, the blow molding tube is inserted into the injection molding die assembly, and then the molten resin is injected into the cavity of the injection molding die assembly to form the injection molded product.

Further, to attain the above object of the invention, in the method for injection molding a large thickness flange at an end of a blow molding tube, tube size correction is done with a mandrel provided in and constituting a part of the blow molding die assembly.

Further, to attain the above object of the invention, in the method for injection molding a large thickness flange at an end of a blow molding tube, the tube size correction is done by machining after the blow molding.

Further, to attain the above object of the invention, in the method for injection molding a large thickness flange at an end of a blow molding tube, the blow molding tube end projecting into the cavity of the injection molding die assembly is preliminarily provided with raised and recessed portions for purpose of coupling onto the injection molded flange.

Further, to attain the above object of the invention, in the method for injection molding a large thickness flange at an end of a blow molding tube, when supplying molding material or parison to the blow molding die assembly, the the molding material or parison is led into the cavity of the blow molding die assembly and molded by a burr-free manner or a substantially burr-free manner, such that the side periphery of the molding material or parison is not clamped with the abutting surfaces of the blow molding dies at the time of closing thereof, and two or more blow molding tubes obtained in this way are inserted in a set of injection molding die assemblies and are coupled together by a common injection molded flange.

Further, to attain the above object of the invention, in the method for injection molding a large thickness flange at an end of a blow molding tube, the blow molding is done such that two or more tubes coupled together in parallel are blow molded.

Further, to attain the above object of the invention, in the method for injection molding a large thickness flange at an end of a blow a molding tube, two or more tubes coupled together in parallel constitute an intake manifold useful in an automotive engine room, and the injection molding is done for forming a common flange at the ends of branch tubes of the intake manifold.

BRIEF DESCRIPTION OF THE DRAWINGS

FIG. 1 is a side view, partly in section, showing a blow molding tube used in Example 1 according to the invention;

FIG. 2 is a side view, partly in section, showing a pair of blow molding dies and a mandrel used in Example 1;

FIG. 3 is a side view, partly in section, showing the blow molding die assembly and a mandrel used under the blow molding tube;

FIG. 4 is a transversal sectional view of the die assembly and the blow molding mandrel shown in FIG. 3;

FIG. 5 is an exploded perspective view showing an injection molding die assembly used in Example 1, in which an injection molding mandrel is provided;

FIG. 6 is a side view, partly in section, showing the injection molding die assembly shown in FIG. 5 with a blow molding tube inserted in the die assembly;

FIG. 7 is a plan view, partly in section, showing the die assembly, the injection molding mandrel and the tube shown in FIG. 6;

FIG. 8 is a sectional view showing a pair of blow molding dies used in Example 2 according to the invention;

FIG. 9 is a front view, partly in section, showing an injection molding die assembly set used in Example 3 according to the invention with a plurality of blow molding tubes inserted in the die set;

FIG. 10 is a perspective view showing a tube gang product obtained by forming a common flange at ends of a plurality of tubes coupled together with burrs at the time of the blow molding in Example 4 according to the invention;

DETAILED DESCRIPTION OF THE INVENTION

Figure 11:
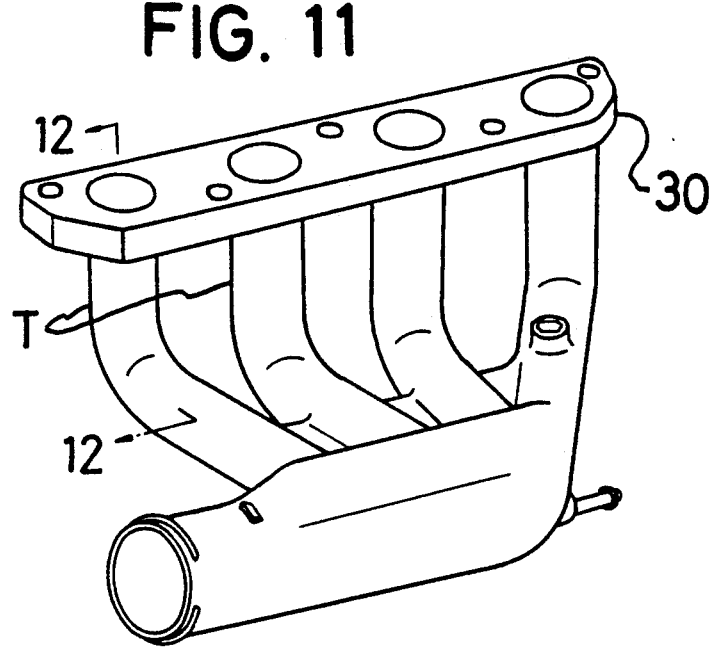
FIG. 11 is a perspective view showing an intake manifold for an automotive engine produced by the invention.

The method according to the invention as shown in FIGS. 1-12 will now be described in detail.

First, a blow molding die assembly for producing a blow molding tube and an injection molding die assembly for forming a flange by injection molding at an end of the blow molding tube are provided.

When using a blow molding mandrel as tube shape correction means for the blow molding die assembly, a pillar-like first mandrel having an optimum size is provided such that it can be assembled to be coaxial with a tube end formation cavity of the blow molding die assembly.

The injection molding die assembly comprises at least two split dies and an injection molding second mandrel. The split dies have respective inner surfaces for holding a blow molding tube portion adjacent to an tube end. The second mandrel is inserted into said tube portion and the tube end. The diameter of the inner holding surfaces of the injection molding die assembly is set to be smaller than the diameter of the corresponding portion of the blow molding die assembly to an extent corresponding to thermal shrinkage of the blow molding tube during cooling down to normal temperature after the blow molding. Likewise, the outer diameter of the second mandrel for the injection molding die assembly is set to be smaller than the outer diameter of the first mandrel for the blow molding die assembly by the amount corresponding to the thermal shrinkage of the blow molding tube.

A desired blow molding tube is first produced by using the blow molding die assembly. At the same time, the inner diameter of the end portion of the blow molding tube, where an integral flange is to be formed, is corrected by using the first mandrel provided in the blow molding die assembly.

Then, the blow molding tube product is separated from the blow molding die assembly, and after removing unnecessary end portions and burrs, if any, it is sufficiently cooled down.

In the blow molding product thus obtained, the outer diameter of the tube portion adjacent to the end which is held with the injection molding die assembly, conforms to the inner diameter of the injection molding die assembly. Also, the inner periphery and the outer periphery of the blow molding tube are coaxial with each other, and the inner diameter of the tube is identical with the outer diameter of the second mandrel for the injection molding die assembly.

Then, when the injection molding die assembly is open, the end of the blow molding tube is inserted into the cavity of the injection molding die assembly at a predetermined position, and then the second mandrel for the injection molding die assembly is inserted into the blow molding tube end portion, and the injection molding die assembly is clamped.

As a result, a state of perfect close contact is obtained between the outer periphery of the blow molding tube and the inner holding surfaces of the injection molding dies and also between the inner periphery of the blow molding tube end portion and the outer periphery of the second mandrel for the injection molding die assembly.

Finally, molten synthetic resin is injected into the cavity of the injection molding die assembly to form a flange made integral with the end of the blow molding tube. The integral molded parts is then cooled and separated from the injection molding die assembly, thus obtaining a desired blow molded tube with an integral large thickness flange.

In another method according to the invention, the inner periphery of the end portion of the blow molding tube, which is separated from the blow molding die assembly, is corrected with reference to and to be coaxial with the outer periphery thereof by using a cutting machine such as a drilling machine, a boring machine, a lathe, a grinding machine, etc. Afterward, injection molding an integral large thickness flange is carried out in the same manner as noted above.

In another method according to the invention, blow molding is carried out by using blow molding dies having recessed and raised portions for forming raised and recessed portions on the outer periphery of a tube end portion. For the rest, the same operation for injection molding an integral large thickness flange is carried out as in the other methods according to the invention.

In another method according to the invention, two or more blow molding die assemblies having different shapes are prepared, and also an injection molding die assembly set is provided, into which blow molded tubes produced by the different blow molding die assemblies can be inserted.

Thus, by inserting the independent blow molding tubes formed by the different blow molding die assemblies into the common injection molded die assembly set, a gang molding product with a common injection molded thick flange is obtained.

In another method according to the invention, molding dies for producing two or more tubes are prepared as both blow molding dies and injection molding dies, and the injection molding step is carried out.

The invention is further illustrated by the following examples:

EXAMPLE 1

Referring to FIGS. 1 to 7, blow molding dies 10a and 10b are used for forming a tube having a uni-dimensionally curved axis or a three-dimensionally curved axis. The surface of a cavity 11 defined by the dies 10a, 10b has annular raised and recessed portions 14 adjacent to its end 13. An annular positioning groove 15 as a part of the cavity 11 is formed on the side of the raised and recessed portions 14 opposite to the end 13. The cavity portion on the side of the groove 15 opposite to the end 13 constitutes a reference or criterion surface 16 for forming a tube portion which is to be held with an injection molding die assembly as described later. The reference or criterion surface 16 is a cylindrical surface having a true circular sectional profile, which is defined by the blow molding dies 10a and 10b (see FIG. 2).

A first mandrel 12 is used for correcting the inner diameter of an end portion of a blow molding tube T to be produced. When the pair of blow molding dies 10a and 10b are closed and the first mandrel 12 is inserted, the outer periphery 17 of the mandrel is held so as to be coaxial with the reference surface 16.

The injection molding die assembly noted above comprises a pair of split dies 20a and 20b for forming the outer periphery and inner end face of a flange 30 of the tube T, and also a third die 20c for forming the outer end face of the tube flange 30 (see FIG. 5).

The pair of split dies 20a and 20b define a flange cavity 21 for forming the flange 30 of the tube T. Adjacent to the flange cavity 21, there are respective gutter-like holding surfaces 22, which have a semi-circular sectional profile for holding the blow molding tube T. A second mandrel 23 for injection molding is provided in the third die 20c, such that this mandrel may be axially movable or fixed in position (see FIG. 5).

Assuming the blow molding temperature to be 190° C. and the temperature of the blow molding tube T after die separation to be 20° C., the shrinkage of the blow molding tube is roughly 1.7%. Thus, assuming the diameter $D_1$ of the reference surface 16 to be 60 mm, the outer diameter $D_2$ of the blow molding tube T after cooling down is reduced by 1.02 mm.

Thus, the inner diameter of the holding surfaces 22 of the injection molding dies 20a and 20b is set to be smaller to an extent corresponding to the shrinkage of the blow molding tube T during the cooling thereof. Namely, the inner diameter of the holding surfaces 22 of the dies 20a and 20b is equal to the outer diameter $D_2$ of the blow molding tube T after cooling down. In this example, the diameter $D_2$ is set to 58.95 mm.

The ratio between the outer diameter $d_1$ of the first mandrel 12 for blow molding and the outer diameter $d_2$ of the second mandrel 23 for injection molding is set likewise (see FIGS. 2 and 6).

The blow molding temperature, tube shrinkage factor and correcting dimension are only examples and of course are variable depending on the blow molding material being used. Namely, the above numerical values are by no means limitative.

Using the above blow molding dies 10a and 10b and the above blow first molding mandrel 12, a blow molding tube T was formed (see FIGS. 3 and 4). Then, the mandrel 12 was withdrawn, and the pair blow molding dies 10a and 10b were separated from one other, and then the blow molding tube T was separated from the dies. Then, immediately the unnecessary end portions and burrs were removed, and the blow molding tube T was cooled down to normal temperature.

The molding material or parison is supplied to the blow molding dies 10a and 10b preferably by a burr-free method, in which the parison is led into the cavity 11, and the parison barrel is not clamped with the blow molding dies when the blow molding dies are closed. However, it is possible to adopt a method subject to burrs, in which the parison barrel is clamped when the dies are closed. Further, it is possible to adopt a method, in which brackets or reinforcement ribs are locally formed on the blow molding tube T.

Subsequently, the blow molding tube T is inserted into the split dies 20a and 20b and die 20c of the injection molding die assembly while in an open state. The tube T may be inserted in any die first. As an example, a reference outer cylindrical portion 33 of the blow molding tube T is fitted in the holding surface 22 of either one of the pair of split dies 20a and 20b, and the end of the positioning flange 31 is engaged with the surface of the flange cavity 21. Then, the third die 20c is assembled, and the injection molding second mandrel 23 is inserted into the blow molding tube T. Finally, the other split die 20a or 20b is assembled, and the injection molding die assembly is sufficiently clamped together.

At this time, a close contact state was obtained between the holding surfaces 22 of the split dies 20a and 20b of the injection molding die assembly and the reference outer surface 33 of the blow molding tube T (see FIG. 1), and also between the injection molding second mandrel 23 and the inner periphery of the blow molding tube T (see FIGS. 6 and 7). In addition, the blow molding tube T, which partly projected from the injection molding dies 20a and 20b, was secured to the dies 20a and 20b or a bed therefor by suitable means to keep the positional relation of the tube to the dies 20a and 20b. Afterward, a sufficient amount of molten resin was injected so as to fill the flange cavity 21 of the injection molding die assembly.

Then, when the dies 20a to 20c were cooled down to a temperature sufficient for separating them, they were separated from one another. Thus, the injection molded product with a large thickness flange was obtained by separating the product from the dies.

EXAMPLE 2

Unlike the preceding Example 1, a blow molding tube T was produced only with the blow molding dies 10c and 10d as shown in FIG. 8 but without a first mandrel 12. In the FIG. 8 parts and portions like those in the Example 1 are designated by like reference numerals and symbols.

The blow molding tube T produced by using these blow molding dies 10c and 10d was separated from the dies, and then after removing unnecessary end portions and burrs it was sufficiently cooled down. Then, by using a cutting machine such as a drilling machine, a boring machine, a lathe, a grinding machine and so on, the inner surface of the tube T was machined to form a bore coaxial with the reference outer surface 33. In this way, the inner diameter of the tube end portion was corrected in conformity to the diameter of the second mandrel 23 for the injection molding die assembly.

Afterward an integral thick flange is formed on the tube T by injection molding in the manner as in the Example 1.

EXAMPLE 3

This example used a set-up as shown in FIG. 9. In the Figure, parts and portions like those in the previous examples are designated by like reference numerals and symbols. In this example, a plurality of blow molding die assemblies (not shown) are prepared to form blow molding tubes T having different shapes. Then, a molding material or parison is introduced into the cavities of the blow molding die assemblies to form blow molding tubes free or substantially free from burrs, by clamping the dies such that the molding material is not clamped thereby. Two or more blow molding tubes T obtained in this way are inserted in a set of injection molding die assemblies 20a to 20c and coupled together with a common molded flange.

In this case, second mandrels 23a to 23d are of course provided in the number corresponding to the number of the blow molding tubes T to be inserted and at positions corresponding thereto.

EXAMPLE 4

Figure 12:
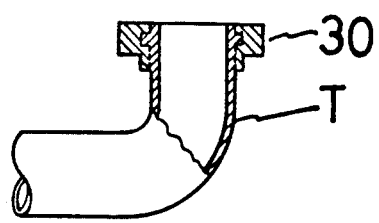
FIG. 12 is a view; partly in section, taken along line 12—12 in FIG. 11.

FIGS. 10 to 12 illustrate this example. In the Figures, parts and portions like those in the previous examples are designated by like reference numerals and symbols. In this example, tube blow molding is done by using a blow molding die assembly (not shown), which has cavities for forming two or more tubes T coupled in parallel. A common integral thick flange 30 is then formed at the ends of these branch tubes by using injection molding dies corresponding to these coupled tubes.

Effects of the Invention

As has been described in the foregoing, in one method according to the invention when the blow molding tube T is inserted into the injection molding die assembly, there is no gap between the inner and outer peripheries of the blow molding tube and the injection molding die assembly, and thus there is no possibility of leakage of the injected molten resin through the contact surfaces of the blow molding tube and those of the injection molding dies and mandrel. In addition, there is no possibility of defective molding of the integral flange due to insufficiency of injected resin. Also, there is no possibility of deformation of the blow molding tube. Further, at the time of the injection molding, sufficient pressure of the injected resin acts on the blow molding portion, thus permitting perfect coupling of the two molding portions. It is thus possible to obtain an injection molded product, the two portions of which are never separated after the injection molding step. Further, it is possible to form a large thickness flange and also greatly unsymmetrically projected flanges. Particularly, the invention is suitable for forming common ribs on branch tubes such as an intake manifold used in an automotive engine room or the like.

In another method according to the invention, the tube shape correction is done by using the first mandrel provided in the blow molding die assembly. Thus, collective correction to accurate dimensions can be made efficiently at the time of the blow molding.

In still another method according to the invention, the tube shape correction is done by grinding or machining after the blow molding step. Thus, it is possible to obtain increased dimensional accuracy and freedom from leakage of molten resin at the time of the injection molding.

In yet another method according to the invention, raised and recessed portions for coupling are preliminarily formed on an end portion of the blow molding product at the time of the blow molding, which end portion projects into the injection molding die assembly cavity. Thus, it is possible to obtain a molded product, in which the injection molding resin and blow molding tube are more firmly coupled together.

In the method according to the invention, by using a blow molding die assembly set, a plurality of tubes ganged together with a common flange can be obtained as a molding free from barrel burrs. Thus, there is no need of removing barrel burrs. In addition, there occurs no cut away by the blow molding dies. Thus, no inner groove is formed in the tube, and it is possible to produce a strong tube permitting smooth air flow through the tube.

In the method according to the invention, it is possible to obtain a molding product, in which a plurality of tubes are coupled together by a common flange.

EFFECTS OF THE EXAMPLES

Example 1 and 2 provides the same effects as those according to FIGS. 1-7.

Example 3 provides, in addition to the above effects, the effect that each blow molding tube is free from the cut away of the molding material or parison by the flow molding dies at the time of the blow molding, the effect that no axial depression is formed on the inner surface of each tube along the parting line, and the effect that a mechanically strong gang of tubes can be obtained, as shown by FIG. 9.

Example 4 permits fabrication of a gang of tubes at the time of the blow molding, ready molding of the tube gang, and mutual holding of the gang tubes without need of securing the molding tubes at the time of the injection molding, thus permitting ready operation at the time of the injection molding, as shown by FIGS. 10-12.

Further, in the method of providing the tube T with the positioning flange 31 at the time of the blow molding in each example, positioning of the blow molding tube T is readily done at the time of the insert molding. In addition, at the time of the injection molding the positioning flange 31 is urged against the lower end of the holding surfaces 22 so as to prevent leakage of the molten resin in this area.

We claim:

1. A method for injection molding a large thickness flange at an end of a plurality of blow molded tubes, comprising the steps of:
   (a) providing the plurality of blow molded tubes, each of said tubes having been blow molded;
   (b) correcting the inner and outer surfaces at one end of each of said blow molded tubes;
   (c) inserting a mandrel from an injection molding die assembly into the corrected end of each of said blow molded tubes;
   (d) injecting a molten resin material into a cavity within the injection molding die assembly, said cavity being located between the outer surface of each said blow molded tube and an inner surface of the die assembly surrounding each said tube, and forming a single large thickness flange which is thermally bonded onto each said corrected end of the blow molded tubes and onto the plurality of tubes so as to couple together the plurality of blow molded tubes wherein said correcting step results in close contact between the injection die assembly and the corrected end of each of said blow molded tubes and thereby prevents leakage of said molten resin during injection; and (e) separating the resulting molded tube and flange product from the injection molding die assembly.

2. The method according to claim 1, wherein the plurality of blow molded tubes are provided by supplying a molding material or parison to a blow molding die assembly, the molding material or the parison is led into a cavity of said blow molding die assembly and molded by a burr-free or substantially burr-free molding manner, such that the side periphery of the tubes are not clamped by abutting surfaces of the blow molding die assembly at the time of closing thereof, and the plurality of blow molding tubes provided in this way are inserted into said injection molding die assembly and each adjacent tube is coupled together by said single large thickness injection molded flange.

3. The method according to claim 1, wherein said plurality of blow molded tubes are coupled together in parallel.

4. The method according to claim 3, wherein said plurality of tubes coupled together in parallel provides an intake manifold useful in an automotive engine room, and the injection molding forms said single large thickness flange at the ends of branch tubes of said manifold.

* * * * *